United States Patent [19]
Usui

[11] Patent Number: 5,809,818
[45] Date of Patent: *Sep. 22, 1998

[54] HIGH-PRESSURE PIPING METAL TUBE AND PROCESS FOR MANUFACTURING THE SAME

[75] Inventor: Masayoshi Usui, Numazu, Japan

[73] Assignee: Usui Kokusai Sangyo Kaisha Limited, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 745,298

[22] Filed: Nov. 8, 1996

[30] Foreign Application Priority Data

Nov. 15, 1995 [JP] Japan ..................................... 7-321134

[51] Int. Cl.$^6$ .................................................... B21D 26/02
[52] U.S. Cl. ........................................ 72/54; 72/60; 72/61
[58] Field of Search ..................... 72/54, 62, 61, 72/60

[56] References Cited

U.S. PATENT DOCUMENTS

| 4,730,474 | 3/1988 | Iwakura et al. .............................. 72/62 |
| 4,735,075 | 4/1988 | Saegusa . |
| 5,042,282 | 8/1991 | Kimura . |
| 5,303,570 | 4/1994 | Kaiser ......................................... 72/62 |
| 5,419,171 | 5/1995 | Bumgarner .................................. 72/62 |
| 5,481,892 | 1/1996 | Roper et al. ................................ 72/62 |
| 5,570,602 | 11/1996 | Bauer ......................................... 72/62 |

FOREIGN PATENT DOCUMENTS

| 55-122825 | 9/1980 | Japan . |
| 62-93029 | 4/1987 | Japan . |
| 1-289514 | 11/1989 | Japan . |

*Primary Examiner*—David Jones
*Attorney, Agent, or Firm*—Anthony J. Casella; Gerald E. Hespos; Ludomir A. Budzyn

[57] ABSTRACT

A high-pressure piping metal tube to be exposed to a high-pressure fluid on its inner face and having an increased number of service times, and a process for manufacturing the high-pressure piping metal tube. This high-pressure piping metal tube is made of a bent metal tube having a large thickness and a small diameter, in which a compressive stress is left in the inner face thereof. The high-pressure piping metal tube manufacturing process, comprises: the step of bending a metal tube having a large thickness and a small diameter; and the step of adding a residual compressive stress to the inner face of said metal tube.

9 Claims, No Drawings

HIGH-PRESSURE PIPING METAL TUBE AND PROCESS FOR MANUFACTURING THE SAME

BACKGROUND OF THE INVENTION

1. Field of the Invention

The present invention relates to a high-pressure piping metal tube for a high-pressure fluid, such as a Diesel engine fuel injection tube or an automotive hydraulic tube, and a process for manufacturing the piping metal tube.

2. Description of the Prior Art

The high-pressure piping metal tube to be used as the Diesel engine fuel injection tube or the automotive hydraulic tube is troubled for its using object by a problem that its material fatigue is so serious that the time period to reach its limit is shortened.

On the other hand, the Diesel engine fuel injection tube or an example of the high-pressure piping metal tube is liable to have such fine flaws left in its surface, when this inner face is finished, as will corrode the inner face to burst the fuel injection tube. At the same time, the Diesel engine fuel injection tube is subjected to high pressures of irregular fluctuations, and is desired to improve its fatigue resistance to the internal pressure against the vibrations of the engine and the car body.

For this desire, there has been proposed a method in which the inner face of the high-pressure piping metal tube is subjected to an accurate finishing treatment or a shot blasting treatment so as to minimizing the working flaws to be left in the inner face of the high-pressure piping metal tube. As disclosed in Japanese Patent Laid-Open No. 122825/1980, more-over, there has been proposed a method in which the inner face of the high-pressure piping metal tube is promptly cooled down while the entire piping metal tube is being heated, so that the inner face of the high-pressure piping metal tube may be adjusted in quality to elongate the lifetime.

However, even the high-pressure piping metal tube thus adjusted is extremely seldom used in a straight position, and is mostly bent and completed. We have examined the inner face of the high-pressure piping metal tube which was adjusted in quality and then subjected to the bending treatment, and have recently revealed that the piping metal tube is released from the adjusted state. This reason is not clarified but seems to come from the following. The distribution of the residual stress, although well balanced, is fluctuated by the subsequent bending treatment so that the stress is locally concentrated in the inner face of the high-pressure piping metal tube by the distribution fluctuations of the residual stress thereby to reduce the number of service times of the high-pressure piping metal tube.

SUMMARY OF THE INVENTION

The present invention contemplates to eliminate the above-specified problems and has an object to provide both a high-pressure piping metal tube to be exposed to a high-pressure fluid on its inner face and having an increased number of service times, and a process for manufacturing the high-pressure piping metal tube.

In order to achieve the above-specified object, we have earnestly progressed the researches and have completed the present invention by finding out that the durability can be given to the high-pressure piping metal tube by bending a piping metal tube material in advance and subsequently by exposing the inner face of the bent piping metal tube to a high-pressure fluid thereby to add the residual compressive stress to the inner face. Specifically, a high-pressure piping metal tube according to the present invention is characterized in that a compressive stress is left in the inner face of the bend metal tube.

Moreover, a process for manufacturing a high-pressure piping metal tube according to the present invention is characterized in that after a piping metal tube is bent, a residual compressive stress is added to the inner face of the metal tube.

In order to add the residual compressive stress, still moreover, the pressure, which exceeds the fluid pressure to be applied to the piping metal tube when used and the yield point of the piping metal tube, is applied to and then released from the inner face of the piping metal tube.

DETAILED DESCRIPTION OF THE INVENTION

Here will be described in detail the present invention.

In the present invention, a piping metal tube, as can be exemplified by a steel tube or a stainless tube having a large thickness and a small diameter, is bent at first. This bending treatment to be applied at this time should not be especially limited but can be suitably exemplified by that used in the prior art, such as the manual bending treatment of ordinary type, the bending treatment using a shaping frame and a bending member, as disclosed in Japanese Patent Laid-Open No. 289514/1989, or the automatic mechanical bending treatment, as disclosed in Japanese Patent Laid-Open No. 93029/1987.

After this bending treatment, the metal tube is exposed on its inner face to a fluid under a high pressure which is higher than both a fluid pressure to be fed to the piping metal tube, when used, and a pressure exceeding the yield point of the piping metal tube. The fluid for applying the pressure to that inner face may be water but preferably oil such as hydraulic working oil. After this pressure application, the fluid is removed from the inner face of the metal tube to leave a compressive stress on the inner face of the high-pressure piping metal tube.

Incidentally, the fluid pressure to be applied has to exceed that to be applied to the piping metal tube when used, and the yield point of the piping metal tube, as described above. The upper limit is the more preferable if the metal tube is the less burst, and is generally at about 3,000 to 6,000 bars although highly dependent upon the material, the external diameter and the thickness of the metal tube. For example, a metal tube, as made of carbon steel to have an external diameter of 6.35 mm and an internal diameter of 1.8 mm, may have an upper limit of about 4,000 bars, and a metal tube, as made of stainless steel to have an external diameter of 6.35 mm and an internal diameter of 1.8 mm, may have an upper limit of about 4,500 bars.

EXAMPLE

Next, an example of the present invention will be described in the following in connection with Reference and Comparison.

[EXAMPLE 1]

As the piping metal tube, there were used six fuel injection tubes for a Diesel engine, as according to the DIN standards 52.0 to have an external diameter of 6.4 mm and an internal diameter of 1.8 mm. These Diesel engine fuel injection tubes were bent to fit the shape for the piping portion and were artificially worked to have a flaw having a depth of 120 microns in the inner faces thereof.

In order that the pressure exceeding the pressure to be applied to the inner face of each Diesel engine fuel injection tube at the fuel injection time and slightly the yield point of the Diesel engine fuel injection tube might be applied to the inner face, more-over, a high-pressure fluid at a pressure of 4,000 bars was introduced to compress the inner faces of the Diesel engine fuel injection tube and was then released to give the residual compressive stress in the inner face of the Diesel engine fuel injection tube.

A high-pressure liquid fuel was repeatedly injected for a period of 20 Hz under a pressure of 1,600 ± 50 bars into each of the Diesel engine fuel injection tubes thus prepared, and the number of repetitions till the Diesel engine fuel injection pipes were burst was counted. This measurement has revealed that any of the fuel injection tubes was not burst even after the repetitions of $1 \times 10^{7}$.

[Reference 1]

A fluid pressure like that of Example 1 was applied to the inner faces of the six Diesel engine fuel injection tubes of straight shape, as made of material and shape similar to those of Example 1. After this, the fluid pressure was released, and the straight-shaped Diesel engine fuel injection tubes were bent to a predetermined shape so that they might be tested as in Example 1. The result is that the number of repetitions till the bursts was as small as $15$ to $50 \times 10^4$.

[Comparison 1]

The six Diesel engine fuel injection tubes of straight type, as made of material and shape similar to those of Example 1, were bent to a predetermined shape. After this, the fuel injection tubes were subjected as they were to tests like those of Example 1, without their inner faces being exposed to the aforementioned fluid pressure. The result is that the number of repetitions till the bursts was as small as $15$ to $100 \times 10^4$.

The execution of the present invention thus far described could drastically increase the number of repetitions till the bursts, as compared with that of the case in which the present invention was not executed.

As has been described hereinbefore, even if there is used the piping metal tube which is bent to a predetermined shape so that it may be piped without delay, it is possible to provide a high-pressure piping metal tube which can sufficiently stand the pressure fluctuation of the liquid fuel to be admitted there-through.

Upon the execution of the present invention, moreover, the high-pressure piping metal tube can be easily manufactured without any special apparatus or means merely by compressing the inner face of the piping metal tube with a high-pressure fluid, so that the cost and the number of steps can be drastically reduced.

What is claimed is:

1. A process for manufacturing a bent metal tube for accommodating a flow of fluid at a specified pressure, said bent metal tube having an inner face and having an outer face with a specified bent shape, said process comprising the steps of:

providing a metal tube having inner and outer faces;

bending the metal tube such that the outer face achieves said specified bent shape, at least portions of the bent metal tube adjacent the inner face having a yield point pressure exposing the inner face of the bent tube to a fluid under a pressure greater than the specified pressure and greater than the yield point pressure such that compressive stress is applied to portions of the bent metal tube adjacent the inner face; and releasing the fluid under pressure from the bent metal tube, such that a residual compressive stress is retained on the inner face of the metal tube.

2. The process of claim 1, wherein the step of exposing the inner face of the bent tube to a fluid under pressure comprises directing water under pressure into said tube.

3. The process of claim 1, wherein the step of exposing the inner face of the bent tube to a fluid under pressure comprises directing hydraulic working oil under pressure into said tube.

4. A process according to claim 1, wherein the step of exposing the inner face of the tube to fluid under pressure comprises applying a fluid under a pressure of between 3,000 and 6,000 bars.

5. The process of claim 1, wherein the tube has an external diameter of approximately 6.4 mm.

6. The process of claim 5, wherein the tube has an internal diameter of approximately 1.8 mm.

7. The process of claim 1, wherein the step of providing a metal tube comprises providing a straight tube and wherein the step of bending the tube comprises presenting the straight tube to a shaping frame and bending the tube against the shaping frame.

8. The process of claim 1, wherein the step of providing a metal tube comprises providing a straight tube and wherein the step of bending the tube comprises presenting the straight tube to an automatic mechanical bending apparatus for automatically bending the tube into the predetermined bent shape.

9. The process of claim 1, wherein the tube has an external diameter and an internal diameter, the external diameter being at least three times greater than the internal diameter.

* * * * *